(12) United States Patent
Feiste et al.

(10) Patent No.: US 10,496,412 B2
(45) Date of Patent: Dec. 3, 2019

(54) PARALLEL DISPATCHING OF MULTI-OPERATION INSTRUCTIONS IN A MULTI-SLICE COMPUTER PROCESSOR

(71) Applicant: International Business Machines Corporation, Armonk, NY (US)

(72) Inventors: Kurt A. Feiste, Austin, TX (US); Michael J. Genden, Austin, TX (US); Paul M. Kennedy, Austin, TX (US); Dung Q. Nguyen, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 196 days.

(21) Appl. No.: 15/018,383

(22) Filed: Feb. 8, 2016

(65) Prior Publication Data

US 2017/0228234 A1  Aug. 10, 2017

(51) Int. Cl.
*G06F 9/38* (2018.01)

(52) U.S. Cl.
CPC .................. *G06F 9/3836* (2013.01)

(58) Field of Classification Search
None
See application file for complete search history.

(56) References Cited

U.S. PATENT DOCUMENTS

| 5,276,819 A | 1/1994 | Rau et al. |
| 5,826,053 A | 10/1998 | Witt |
| 5,896,518 A | 4/1999 | Yao et al. |
| 7,366,879 B2 | 4/2008 | Rodgers et al. |
| 2002/0087955 A1* | 7/2002 | Ronen ............... G06F 9/3001 717/151 |
| 2004/0181652 A1* | 9/2004 | Ahmed ............... G06F 9/30036 712/215 |
| 2011/0185159 A1* | 7/2011 | Bishop ............... G06F 9/3855 712/208 |
| 2015/0100763 A1* | 4/2015 | Holm ............... G06F 9/30145 712/210 |

OTHER PUBLICATIONS

Safaei et al., "Dynamic Routing of Data Stream Tuples Among Parallel Query Plan Running on Multi-Core Processors", Distributed Parallel Databases 30.2, published online Mar. 8, 2012, 32 pages, DOI 10.1007/s10619-012-7090-6, Springer Science+Business Media, LLC 2012.

* cited by examiner

*Primary Examiner* — John M Lindlof
(74) *Attorney, Agent, or Firm* — Nathan M. Rau

(57) ABSTRACT

Parallel dispatching of multi-operation instructions in a multi-slice computer processor, including: determining whether an instruction must be broken into a plurality of smaller operations; marking each of the smaller operations as instructions to be dispatched in parallel; determining whether each of the operations can be dispatched to distinct instruction issue queues during a same clock cycle; and responsive to determining that each of the operations can be dispatched to distinct instruction issue queues during the same clock cycle, dispatching each of the operations to distinct instruction issue queues during the same clock cycle.

14 Claims, 6 Drawing Sheets

PARALLEL DISPATCHING OF MULTI-OPERATION INSTRUCTIONS IN A MULTI-SLICE COMPUTER PROCESSOR

BACKGROUND

Field of the Invention

The field of the invention is data processing, or, more specifically, methods, computer processors, and systems for parallel dispatching of multi-operation instructions.

Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

Modern computer systems can include computer processors that support an instruction set that can include instructions that must be segmented into smaller operations. In order to support such instructions, computer processors can include dedicated registers that are utilized to store intermediate results of each of the smaller operations. Such dedicated registers may be expensive and space consuming.

SUMMARY

Methods, computer processors, and systems for parallel dispatching of multi-operation instructions in a multi-slice computer processor, including: determining whether an instruction must be broken into a plurality of smaller operations; marking each of the smaller operations as instructions to be dispatched in parallel; determining whether each of the operations can be dispatched to distinct instruction issue queues during a same clock cycle; and responsive to determining that each of the operations can be dispatched to distinct instruction issue queues during the same clock cycle, dispatching each of the operations to distinct instruction issue queues during the same clock cycle.

The foregoing and other objects, features and advantages of the invention will be apparent from the following more particular descriptions of example embodiments of the invention as illustrated in the accompanying drawings wherein like reference numbers generally represent like parts of example embodiments of the invention.

DETAILED DESCRIPTION

Figure 1:
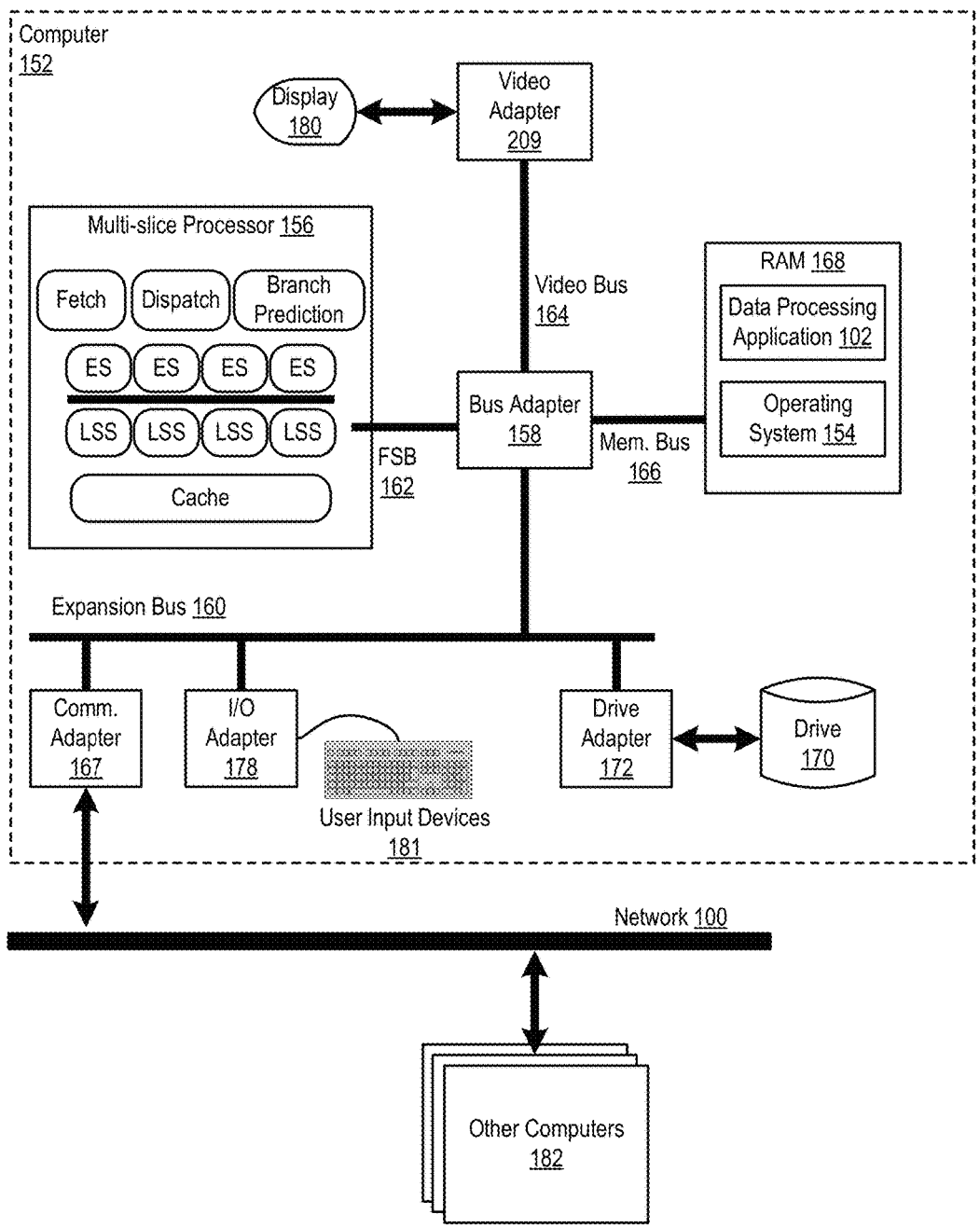
FIG. 1 sets forth a block diagram of an example system configured for parallel dispatching of multi-operation instructions in a multi-slice computer processor according to embodiments of the present disclosure.

Example methods, computer processors, and systems for parallel dispatching of multi-operation instructions in accordance with the present invention are described with reference to the accompanying drawings, beginning with FIG. 1. FIG. 1 sets forth a block diagram of an example system configured for parallel dispatching of multi-operation instructions in a multi-slice computer processor according to embodiments of the present disclosure. The system of FIG. 1 includes an example of automated computing machinery in the form of a computer (152).

The computer (152) of FIG. 1 includes at least one computer processor (156) or 'CPU' as well as random access memory (168) ('RAM') which is connected through a high speed memory bus (166) and bus adapter (158) to processor (156) and to other components of the computer (152).

The example computer processor (156) of FIG. 1 may be implemented as a multi-slice processor. The term 'multi-slice' as used in this specification refers to a processor having a plurality of similar or identical sets of components, where each set may operate independently of all the other sets or in concert with the one or more of the other sets. The multi-slice processor (156) of FIG. 1, for example, includes several execution slices ('ES') and several load/store slices ('LSS'). Each execution slice may be configured to provide components that support execution of instructions: an issue queue, general purpose registers, a history buffer, an arithmetic logic unit (including a vector scalar unit, a floating point unit, and others), and the like. Each of the load/store slices may be configured with components that support data movement operations such as loading of data from cache or memory or storing data in cache or memory. In some embodiments, each of the load/store slices includes a data cache. The load/store slices are coupled to the execution slices through a results bus. In some embodiments, each execution slice may be associated with a single load/store slice to form a single processor slice. In some embodiments, multiple processor slices may be configured to operate together.

The example multi-slice processor (156) of FIG. 1 may also include, in addition to the execution and load/store slices, other processor components. In the system of FIG. 1, the multi-slice processor (156) includes fetch logic, dispatch logic, and branch prediction logic. Further, although in some embodiments each load/store slice includes cache memory, the multi-slice processor (156) may also include cache accessible by any or all of the processor slices.

Although the multi-slice processor (156) in the example of FIG. 1 is shown to be coupled to RAM (168) through a front side bus (162), a bus adapter (158) and a high speed memory bus (166), readers of skill in the art will recognize that such configuration is only an example implementation. In fact, the multi-slice processor (156) may be coupled to other components of a computer system in a variety of configurations. For example, the multi-slice processor (156) in some embodiments may include a memory controller configured for direct coupling to a memory bus (166). In some embodiments, the multi-slice processor (156) may support direct peripheral connections, such as PCIe connections and the like.

Stored in RAM (168) in the example computer (152) is a data processing application (102), a module of computer program instructions that when executed by the multi-slice processor (156) may provide any number of data processing tasks. Examples of such data processing applications may include a word processing application, a spreadsheet application, a database management application, a media library application, a web server application, and so on as will occur to readers of skill in the art. Also stored in RAM (168) is an operating system (154). Operating systems useful in computers configured for reducing power consumption in a multi-slice computer processor according to embodiments of the present disclosure include UNIX™, Linux™, Microsoft Windows™, AIX®, IBM's z/OS™, and others as will occur to those of skill in the art. The operating system (154) and data processing application (102) in the example of FIG. 1 are shown in RAM (168), but many components of such software typically are stored in non-volatile memory also, such as, for example, on a disk drive (170).

The computer (152) of FIG. 1 includes disk drive adapter (172) coupled through expansion bus (160) and bus adapter (158) to processor (156) and other components of the computer (152). Disk drive adapter (172) connects non-volatile data storage to the computer (152) in the form of disk drive (170). Disk drive adapters useful in computers configured for parallel dispatching of multi-operation instructions in a multi-slice computer processor according to embodiments of the present disclosure include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computer (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The example computer (152) of FIG. 1 includes a communications adapter (167) for data communications with other computers (182) and for data communications with a data communications network (100). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful in computers configured for reducing power consumption in a multi-slice computer processor according to embodiments of the present disclosure include modems for wired dial-up communications, Ethernet (IEEE 802.3) adapters for wired data communications, and 802.11 adapters for wireless data communications.

The arrangement of computers and other devices making up the example system illustrated in FIG. 1 are for explanation, not for limitation. Data processing systems useful according to various embodiments of the present disclosure may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present disclosure may be implemented on a variety of hardware platforms in addition to those illustrated in FIG. 1.

Figure 2:
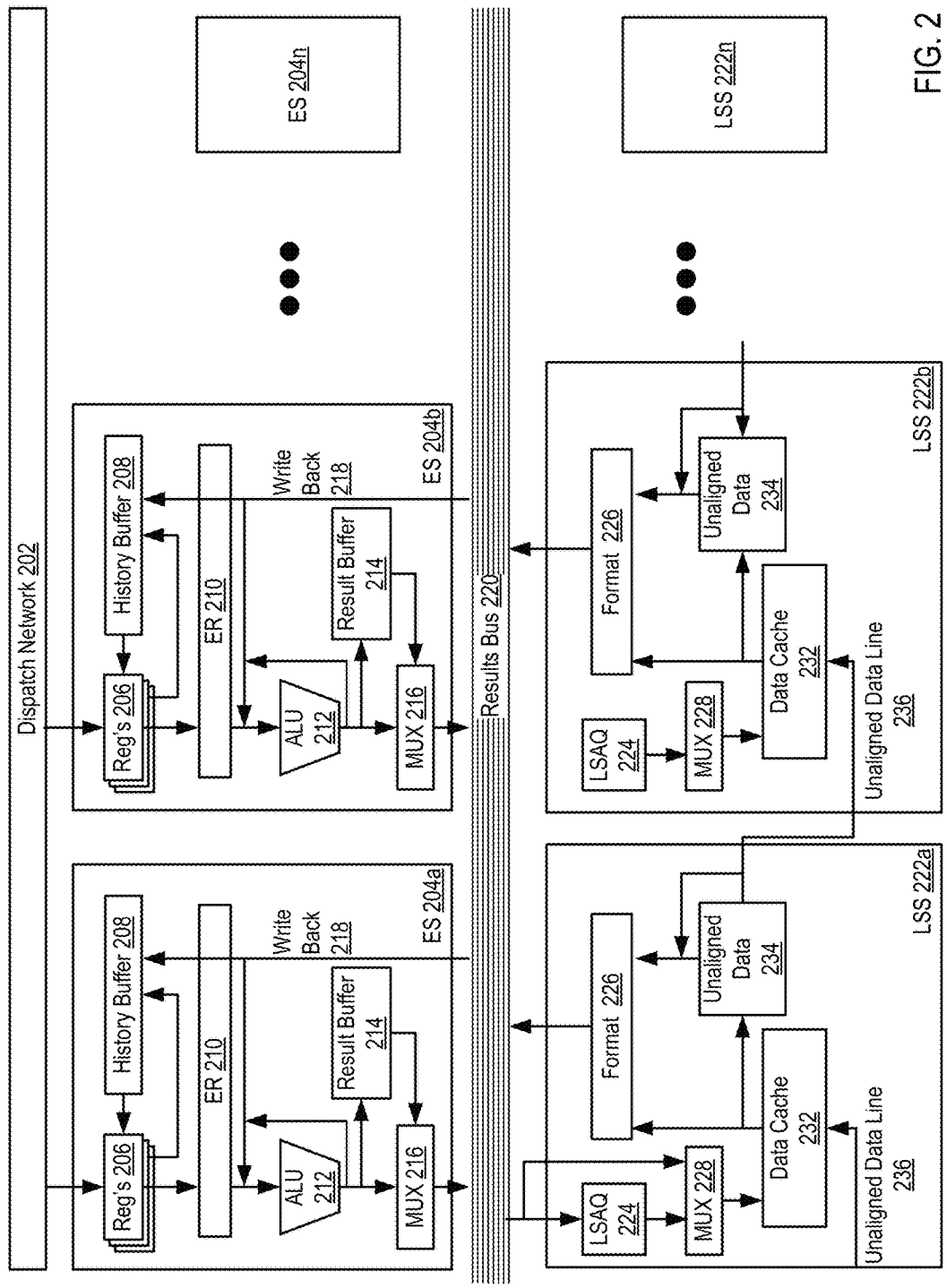
FIG. 2 sets forth a block diagram of a portion of a multi-slice processor, also referred to as a multi-slice computer processor, according to embodiments of the present disclosure.

For further explanation, FIG. 2 sets forth a block diagram of a portion of a multi-slice processor, also referred to as a multi-slice computer processor, according to embodiments of the present disclosure. The multi-slice processor in the example of FIG. 2 includes a dispatch network (202). The dispatch network (202) includes logic configured to dispatch instructions for execution among execution slices.

The multi-slice processor in the example of FIG. 2 also includes a number of execution slices (204a, 204b-204n). Each execution slice includes general purpose registers (206) and a history buffer (208). The general purpose registers and history buffer may sometimes be referred to as the mapping facility, as the registers are utilized for register renaming and support logical registers.

The general purpose registers (206) are configured to store the youngest instruction directed to a particular logical register and the result of the execution of the instruction. A logical register is an abstraction of a physical register that enables out-of-order execution of instructions that target the same physical register.

When a younger instruction directed to the same particular logical register is received, the entry in the general purpose register is moved to the history buffer. The history buffer (208) may be configured to store many instructions directed to the same logical register. That is, the general purpose register is generally configured to store a single, youngest instruction for each logical register while the history buffer may many, non-youngest instructions for each logical register.

Each execution slice (204) of the multi-slice processor of FIG. 2 also includes an execution reservation station (210). The execution reservation station (210) may be configured to issue instructions for execution. The execution reservation station (210) may include an issue queue. The issue queue may include an entry for each operand of an instruction. The execution reservation station may issue the operands for execution by an arithmetic logic unit (212) or to a load slice (222a, 222b, 222c) via the results bus (220).

The arithmetic logic unit depicted in the example of FIG. 2 may be composed of many components, such as add logic, multiply logic, floating point units, vector/scalar units, and so on. Once an arithmetic logic unit executes an operand, the result of the execution may be stored in the result buffer (214) or provided on the results bus (220) through a multiplexer (216).

The results bus may be configured in a variety of manners and be of composed in a variety of sizes. In some instances, each execution slice may be configured to provide results on a single bus line of the results bus (220). In a similar manner, each load/store slice may be configured to provide results on a single bus line of the results bus (220). In such a configuration, a multi-slice processor with four processor slices may have a results bus with eight bus lines—four bus lines assigned to each of the four load/store slices and four bus lines assigned to each of the four execution slices. Each of the execution slices may be configured to snoop results on any of the bus lines of the results bus.

The multi-slice processor in the example of FIG. 2 also includes a number of load/store slices (222a, 222b-222n). Each load/store slice includes a queue (224), a multiplexer (228), a data cache (232), unaligned data logic (234) and formatting logic (226). The queue receives load and store operations to be carried out by the load/store slice (222).

The unaligned data logic (234) of each slice is coupled to the unaligned data logic of another slice through the unaligned data line (236). The unaligned data logic (234) enables data to be stored and retrieved across multiple load/store slices. The formatting logic (226) formats data into a form that may be returned on the results bus (220) to an execution slice as a result of a load instruction.

The multi-slice processor in the example of FIG. 2 may implement an architected register file using the general purpose registers (206), as each register may be used to hold a single entry in the architected register file. The multi-slice processor in the example of FIG. 2 may also implement a re-order buffer using the general purpose registers (206), as each register may be used to hold a single entry in the re-order buffer.

The multi-slice processor in the example of FIG. 2 may be configured for parallel dispatching of multi-operation instructions according to embodiments of the present disclosure by: determining whether an instruction must be broken into a plurality of smaller operations; breaking the instruction into a plurality of smaller operations; marking each of the smaller operations as instructions to be dispatched in parallel; marking the last operation as a terminating operation; designating, as a source register for the younger operation, a target register for the older operation; determining whether each of the operations can be dispatched to distinct instruction issue queues during a same clock cycle; dispatching each of the operations to distinct instruction issue queues during the same clock cycle in response to determining that each of the operations can be dispatched to distinct instruction issue queues during the same clock cycle; and dispatching each of the operations to distinct instruction issue queues during a subsequent clock cycle in response to determining that each of the operations cannot be dispatched to distinct instruction issue queues during the same clock cycle, as will be described in greater detail below.

Figure 3:
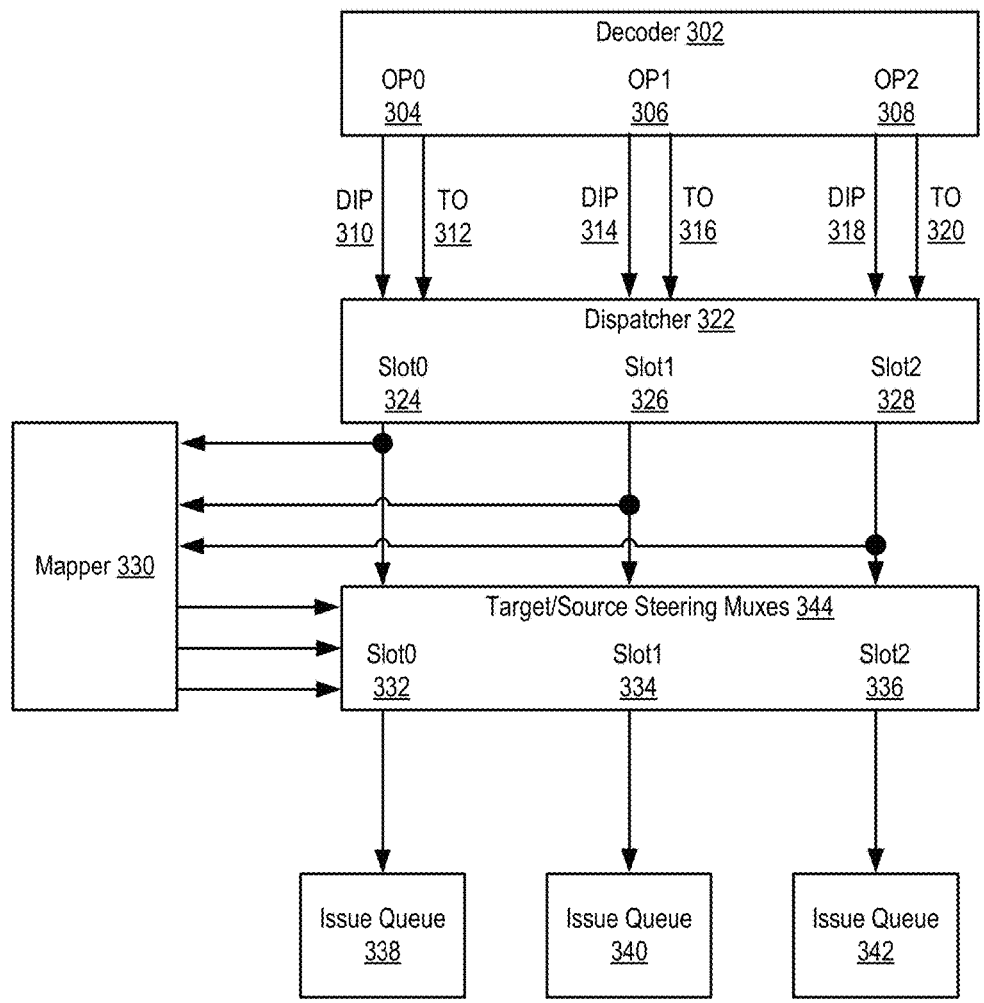
FIG. 3 sets forth a block diagram of logic within a multi-slice computer processor that is useful for parallel dispatching of multi-operation instructions according to embodiments of the present invention.

For further explanation, FIG. 3 sets forth a block diagram of logic within a multi-slice computer processor that is useful for parallel dispatching of multi-operation instructions according to embodiments of the present invention. The logic depicted in FIG. 3 may reside, entirely or in part, above the dispatch network described above with reference to FIG. 2 and may utilize the dispatch network to dispatch instructions to slices within the multi-slice computer processor.

The example depicted in FIG. 3 includes a decoder (302) that is capable of decoding three instructions simultaneously and transmitting information needed to dispatch three instructions simultaneously to the dispatcher (322). In the example depicted in FIG. 3, decoder (302) that is capable of decoding three instructions simultaneously and transmitting information needed to dispatch three instructions simultaneously to the dispatcher (322) via three sets of hardware and data communications links between the decoder (302) and the dispatcher (322) which are labelled herein as OP0 (304), OP1 (306), and OP2 (308). In the example depicted in FIG. 3, each set of data communications links between the decoder (302) and the dispatcher (322) includes a dispatch-in-parallel (310, 314, 318) signal line available to assert a dispatch-in-parallel signal for a particular instruction whose information is being sent from the decoder (302) to the dispatcher (322), as will be described in greater detail below. In addition, each set of data communications links between the decoder (302) and the dispatcher (322) includes a terminating operation (312, 316, 320) signal line available to assert a signal indicating whether an particular instruction is whose information is being sent from the decoder (302) to the dispatcher (322) is a terminating instruction in a sequence of instructions, as will be described in greater detail below.

The example method depicted in FIG. 3 also includes a dispatcher (322) that includes three distinct slots, slot0 (324), slot1 (326), and slot2 (328), for dispatching instructions to issues queues (338, 340, 342). The dispatcher (322) may issue instructions to issue queues (338, 340, 342) directly through a network of target/source steering multiplexers (344) that are used to select one or more target registers where an instruction to be issued to an instruction queue (338, 340, 342) should write data generated by executing the instruction, as well as one or more source registers where a particular instruction can find operands utilized during execution of the instruction. Given that the dispatcher (322) can dispatch three instructions in parallel, the target/source steering multiplexers (344) includes three slots, slot0 (332), slot1 (334), and slot2 (336), that are linked to each instruction queue (338, 340, 342). The dispatcher (322) may also issue instructions to issue queues (338, 340, 342) indirectly through the use of a mapper (330) that is coupled to the network of target/source steering multiplexers (344). Readers will appreciate that because source registers and target registers are set prior to dispatching instructions into an execution queue, once an instruction is dispatched into an instruction queue, the source registers and target registers may not be repurposed for use by other instructions until the dispatched instructions have finished executing. Readers will further appreciate that although three paths are illustrated in the example depicted in FIG. 3, any plurality of paths are well within embodiments of the present disclosure.

Figure 4:
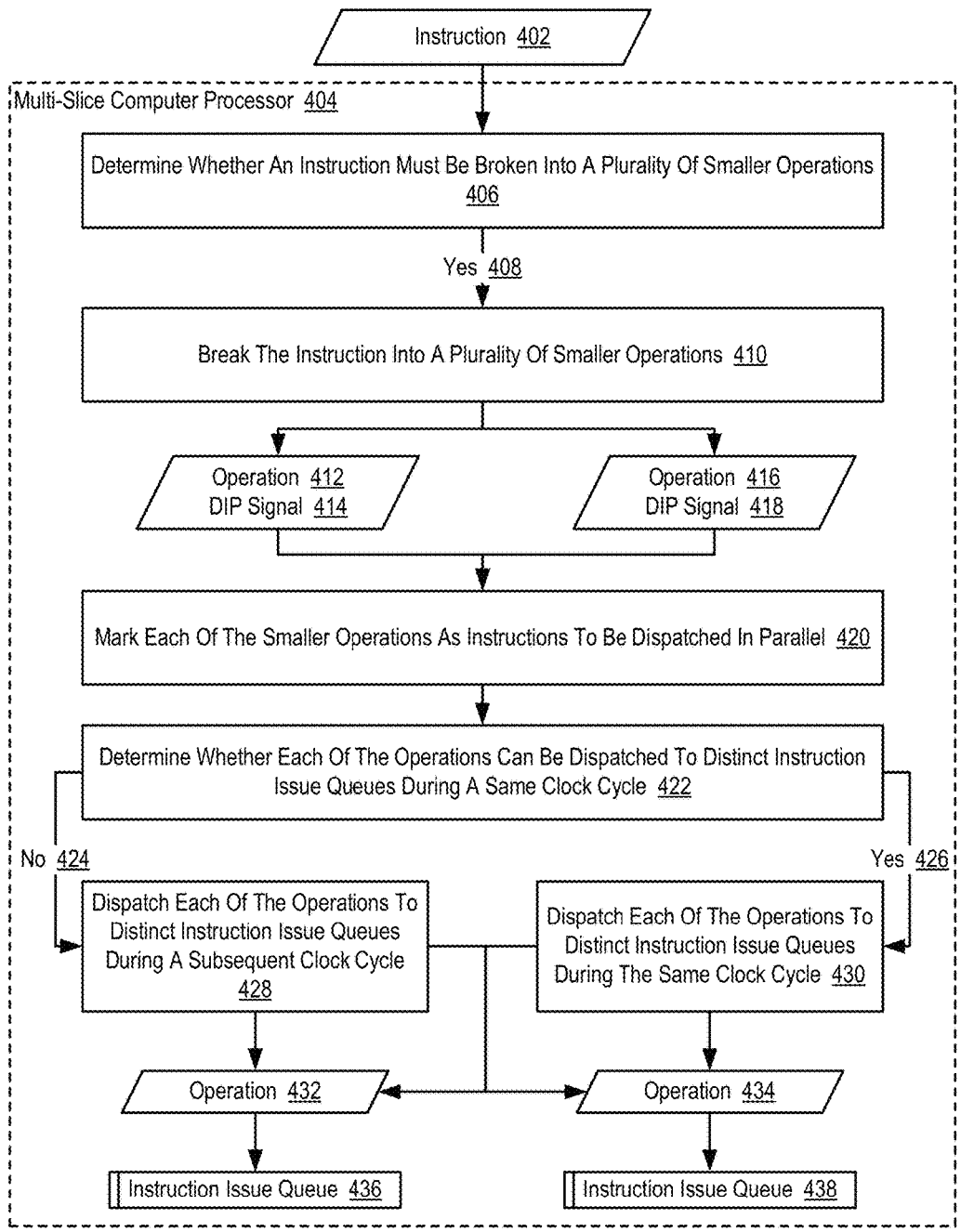
FIG. 4 sets forth a flow chart illustrating an example method for parallel dispatching of multi-operation instructions in a multi-slice computer processor according to embodiments of the present disclosure.

For further explanation, FIG. 4 sets forth a flow chart illustrating an example method for parallel dispatching of multi-operation instructions in a multi-slice computer processor (404) according to embodiments of the present disclosure. Although depicted in less detail, the multi-slice computer processor (404) depicted in FIG. 4 may be similar to the multi-slice computer processors described with reference to the preceding figures, and components within the multi-slice computer processor (404) may also be similar to the components described above with reference to the preceding figures.

The example method depicted in FIG. 4 includes determining (406) whether an instruction (402) must be broken into a plurality of smaller operations (412, 416). Readers will appreciate that some instructions may be sufficiently complex that executing the instruction (402) may require the execution of a plurality of smaller operations (412, 416) over the course of multiple clock cycles. For example, an instruction retrieve the contents from multiple registers, perform some sort of logical computation on the contents of each register, and write a value generated in response to the logical computation to another register may be broken into plurality of smaller operations (412, 416) where a first operation retrieves the contents from multiple registers, a second operation performs the logical computation on the contents of each register, and a third operation writes a value generated in response to the logical computation to another register. Readers will appreciate that this example is for explanatory purposes only as the particular details of an instruction set will dictate whether the instruction set includes instructions (402) that must be broken into a plurality of smaller operations (412, 416).

In the example method depicted in FIG. 4, determining (406) whether an instruction (402) must be broken into a plurality of smaller operations (412, 416) may be carried out, for example, by an instruction decoder that is included as a component within the multi-slice computer processor (404). The instruction decoder may be embodied, for example, as a circuit or other piece computer logic configured to read the instruction (402) in from memory and send the component pieces of that instruction to the necessary destination. The instruction decoder may be configured to determine (406) whether an instruction (402) must be broken into a plurality of smaller operations (412, 416), for example, by maintaining or otherwise accessing information that associates identifiers for instructions (e.g., an opcode) with information describing whether instructions with matching identifiers must be broken into a plurality of smaller operations, information that describes the number of smaller operations that instructions with matching identifiers must be broken into, information identifying which specific smaller operations that instructions with matching identifiers must be broken into, and so on.

The example method depicted in FIG. 4 also includes breaking (410) the instruction (402) into a plurality of smaller operations (412, 416). In the example method depicted in FIG. 4, breaking (410) the instruction (402) into a plurality of smaller operations (412, 416) may be carried out in response to affirmatively (408) determining that the instruction (402) must be broken into a plurality of smaller operations (412, 416). Breaking (410) the instruction (402) into a plurality of smaller operations (412, 416) may be carried out, for example, by the instruction decoder mentioned above. In such an example, the instruction decoder may be configured to maintain or otherwise access information that associates identifiers for instructions (e.g., an opcode) with information describing which specific smaller operations that instructions with matching identifiers must be broken into. The instruction decoder may therefore break (410) the instruction (402) into a plurality of smaller operations (412, 416) by creating the specific smaller operations that an instruction with an identifier that matches the identifier of the instruction (402) must be broken into. The instruction decoder may be configured to include one or more parameters contained in the instruction (402) such as, for example, an identification of one or more source registers, an identification of a target register, and so on, as parameters in one or more of the smaller operations (412, 416).

The example method depicted in FIG. 4 also includes marking (420) each of the smaller operations (412, 416) as instructions to be dispatched in parallel. In the example method depicted in FIG. 4, each of the smaller operations (412, 416) may include a dispatch-in-parallel signal (414, 418) that can be asserted by the instruction decoder to signal that the smaller operations (412, 416) do or do not need to be dispatched in parallel. The dispatch-in-parallel signal (414, 418) may be embodied, for example, as a bit located at particular location within a collection of bits that is used to describe the smaller operation (412, 416). Such a collection of bits may include bits at a particular location that identify an opcode for the smaller operation (412, 416), bits at a particular location that identify the location of operands for the smaller operation (412, 416), and so on. As such, marking (420) each of the smaller operations (412, 416) as instructions to be dispatched in parallel may be carried out by setting the value of the bit that represents the dispatch-in-parallel signal (414, 418) to a value that indicates that the smaller operations (412, 416) are to be dispatched in parallel.

The example method depicted in FIG. 4 also includes determining (422) whether each of the smaller operations (412, 416) can be dispatched to distinct instruction issue queues (436, 438) during a same clock cycle. In the example method depicted in FIG. 4, determining (422) whether each of the operations (412, 416) can be dispatched to distinct instruction issue queues (436, 438) during a same clock cycle may be carried out, for example, by an instruction dispatcher. The instruction dispatcher may be embodied, for example, as a circuit or other piece computer logic configured to load instructions into instruction issue queues (436, 438) from which instructions are retrieved and executed by execution units. The instruction dispatcher may be configured to determine (422) whether each of the operations (412, 416) can be dispatched to distinct instruction issue queues (436, 438) during a same clock cycle, for example, by determining whether a sufficient number of issue queues (436, 438) have an available slots such that each of the smaller operations (412, 416) can be dispatched to distinct instruction issue queues (436, 438) during a same clock cycle.

Consider an example in which a particular instruction (402) is broken into two smaller operations (412, 416). In such an example, assume that the multi-slice computer processor (404) includes two instruction issue queues (436, 438). When one or both of the instruction issue queues (436, 438) do not have an available slot (i.e., an instruction has already been dispatched to the next slot in one or both queues), the instruction dispatcher may determining that each of the smaller operations (412, 416) cannot (424) be dispatched to distinct instruction issue queues (436, 438) during a same clock cycle. When both of the instruction issue queues (436, 438) do have an available slot (i.e., an instruction has not already been dispatched to the next slot in either queue), the instruction dispatcher may affirmatively (426) determine that each of the smaller operations (412, 416) can be dispatched to distinct instruction issue queues (436, 438) during a same clock cycle.

Readers will appreciate that the multi-slice computer processor (404) may include multiple instruction issue queues (436, 438) because the multi-slice computer processor (404) includes multiple slices. As such, the multi-slice computer processor (404) may also include multiple execution units, each of which executes instructions contained in a distinct instruction issue queue (436, 438). For example, the execution unit within a first slice of the multi-slice computer processor (404) may retrieve and execute instructions contained in a first instruction issue queue (436) while the execution unit within a second slice of the multi-slice computer processor (404) may retrieve and execute instructions contained in a second instruction issue queue (438).

The example method depicted in FIG. 4 also includes dispatching (430) each of the operations (432, 434) to distinct instruction issue queues (436, 438) during the same clock cycle. The multi-slice computer processor (404) depicted in FIG. 4 may be configured to dispatch instructions into an instruction issue queue (436, 438) for each slice of the multi-slice computer processor (404) every clock cycle. For example, during a single clock cycle, a first instruction may be dispatched to an instruction issue queue (436) for a first slice of the multi-slice computer processor (404), a second instruction may be dispatched to an instruction issue queue (438) for a second slice of the multi-slice computer processor (404), and so on. In the example method depicted in FIG. 4, dispatching (430) each of the operations (432, 434) to distinct instruction issue queues (436, 438) during the same clock cycle may be carried out in response to affirmatively (426) determining that each of the operations (432, 434) can be dispatched to distinct instruction issue queues (436, 438) during the same clock cycle.

The example method depicted in FIG. 4 also includes dispatching (428) each of the operations (432, 434) to distinct instruction issue queues (436, 438) during a subsequent clock cycle. In the example method depicted in FIG. 4, dispatching (428) each of the operations (432, 434) to distinct instruction issue queues (436, 438) during a subsequent clock cycle may be carried out in response to determining that each of the operations (432, 434) cannot (424) be dispatched to distinct instruction issue queues (436, 438) during the same clock cycle.

Consider an example in which the multi-slice computer processor (404) retrieves a particular instruction (402), determines (406) that the instruction (402) must be broken into a plurality of smaller operations (412, 416), and breaks (410) the instruction (402) into two smaller operations (412, 416). In such an example, further assume that the multi-slice computer processor (404) determines (422) that each of the smaller operations (412, 416) cannot (424) be dispatched to distinct instruction issue queues (436, 438) during clock cycle 0, because only one instruction issue queues (436) has an available slot. In such an example, the multi-slice computer processor (404) may dispatch (428) each of the operations (432, 434) to distinct instruction issue queues (436, 438) during a subsequent clock cycle by waiting until clock cycle 1 to dispatch (428) each of the operations (432, 434) to distinct instruction issue queues (436, 438). In such a way, even though one instruction issue queues (436) had an available slot during clock cycle 0 and the instruction dispatcher had two operations (432, 434) available for dispatching, the multi-slice computer processor (404) may delay the dispatching of either operation (432, 434) until clock cycle 1 so that the two operations (432, 434) can be dispatched in parallel.

Figure 5:
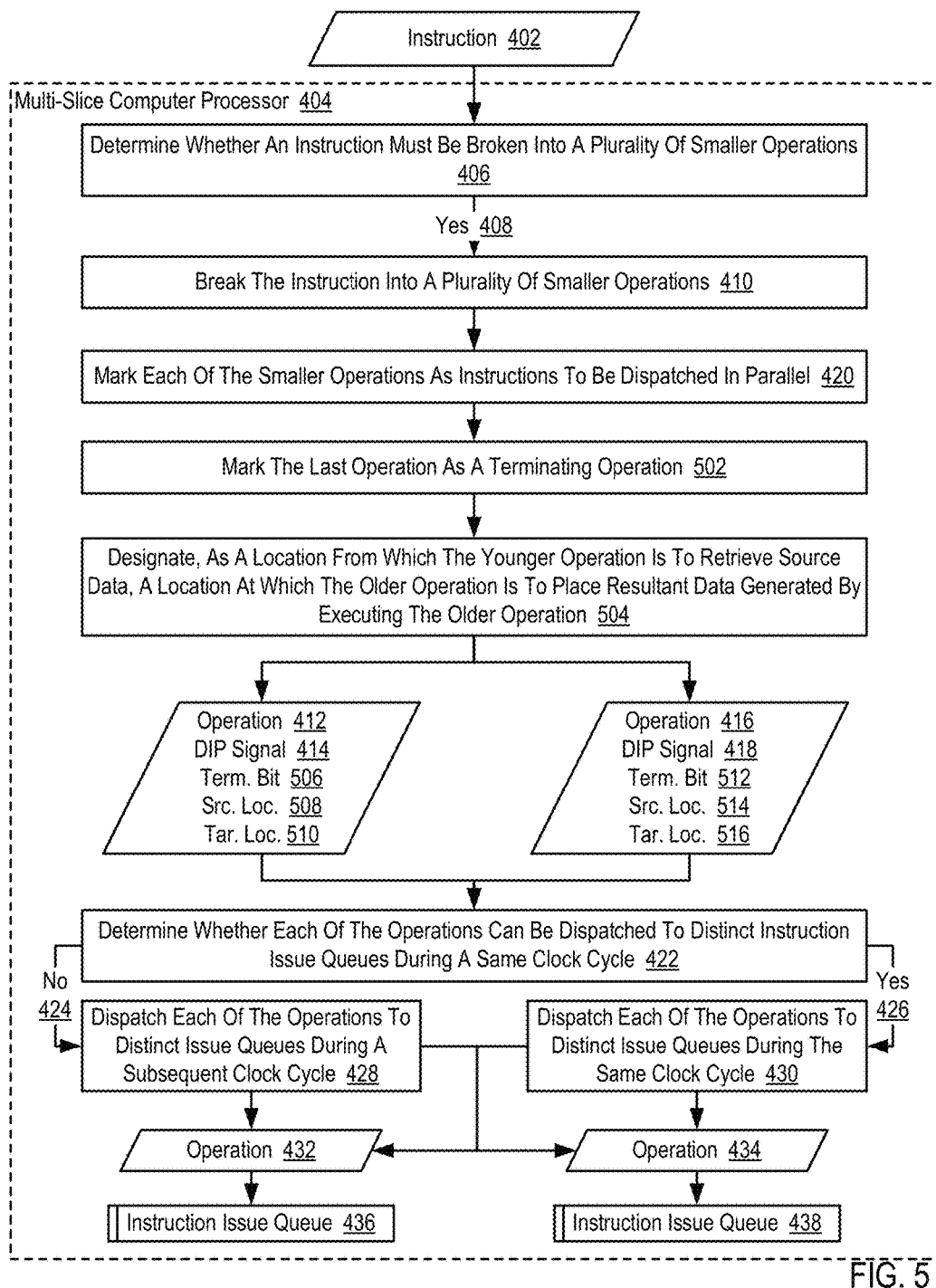
FIG. 5 sets forth a flow chart illustrating an additional example method for parallel dispatching of multi-operation instructions in a multi-slice computer processor according to embodiments of the present disclosure.

For further explanation, FIG. 5 sets forth a flow chart illustrating an additional example method for parallel dispatching of multi-operation instructions in a multi-slice computer processor (404) according to embodiments of the present disclosure. The example method depicted in FIG. 5 is similar to the example method depicted in FIG. 4, as the example method depicted in FIG. 5 also includes determining (406) whether an instruction (402) must be broken into a plurality of smaller operations (412, 416), breaking (410) the instruction (402) into a plurality of smaller operations (412, 416), marking (420) each of the smaller operations (412, 416) as instructions to be dispatched in parallel, determining (422) whether each of the smaller operations (412, 416) can be dispatched to distinct instruction issue queues (436, 438) during a same clock cycle, dispatching (430) each of the operations (432, 434) to distinct instruction issue queues (436, 438) during the same clock cycle in response to affirmatively (426) determining that each of the operations (432, 434) can be dispatched to distinct instruction issue queues (436, 438) during the same clock cycle, and dispatching (428) each of the operations (432, 434) to distinct instruction issue queues (436, 438) during a subsequent clock cycle in response to determining that each of the operations (432, 434) cannot (424) be dispatched to distinct instruction issue queues (436, 438) during the same clock cycle.

The example method depicted in FIG. 5 also includes marking (502) the last operation as a terminating operation. As described above, an instruction (402) retrieved by the multi-slice computer processor (404) may be broken into a plurality of smaller operations (412, 416). Such smaller operations (412, 416) may need to be executed in a particular order to ensure proper execution of the instruction (402). Consider the example described above in which the multi-slice computer processor (404) supports an instruction set that includes an instruction to retrieve the contents from multiple registers, perform some sort of logical computation on the contents of each register, and write a value generated in response to the logical computation to another register may be broken into plurality of smaller operations (412, 416). In such an example, a first operation may be executed that retrieves the contents from multiple registers, a second operation may subsequently be executed that performs the logical computation on the contents of each register, and a third operation may then be executed that writes a value generated in response to the logical computation to another register. In such an example, the last operation to be executed in the sequence may be marked (502) as the terminating operation.

In the example method depicted in FIG. 5, marking (502) the last operation as a terminating operation may be carried out, for example, through the use of one or more values contained in the smaller operation itself. The example method depicted in FIG. 5 includes, as an example of a value contained in the smaller operation itself, a termination bit (506, 512) in each smaller operation (412, 416). Such a termination bit (506, 512) may be embodied as a bit located at particular location within a collection of bits that is used to describe the smaller operation (412, 416). The multi-slice computer processor (404) may be configured such that a termination bit (506, 512) of a first value may be interpreted as an indication that the smaller operation (412, 416) is a terminating operation while a termination bit (506, 512) of a second value may be interpreted as an indication that the smaller operation (412, 416) is not a terminating operation. In such an example, marking (502) the last operation as a terminating operation may be carried out be setting the value of the termination bit (506, 512) in the smaller operation that is to be executed last to the appropriate value, and also setting the value of the termination bit (506, 512) in each smaller operation that will not be executed last to the appropriate value. The multi-slice computer processor (404) may be able to identify the last operation within a sequence given that the instruction (402) will be broken into a known group of smaller operations (412, 416) whose execution order may also be known and provided to the multi-slice computer processor (404).

In the example method depicted in FIG. 5, a younger operation can utilize results generated by an older operation.

Readers will appreciate that the designation of smaller operations (412, 416) as being 'younger' or 'older' is determined by the order in which the smaller operations (412, 416) will execute. For example, if a first smaller operation (412) executes at a particular time and a second smaller operation (416) executes at a later time, the first smaller operation (412) is described as being 'older' than the second smaller operation (416). Consider the example described above in which the multi-slice computer processor (404) supports an instruction set that includes an instruction to retrieve the contents from multiple registers, perform some sort of logical computation on the contents of each register, and write a value generated in response to the logical computation to another register may be broken into plurality of smaller operations (412, 416). In such an example, a first operation may be executed that retrieves the contents from multiple registers, a second operation may subsequently be executed that performs the logical computation on the contents of each register, and a third operation may then be executed that writes a value generated in response to the logical computation to another register. In this example, the first operation would be designated as the oldest operation while the third operation would be designated as the youngest operation. Readers will appreciate that this example also includes an example where a younger operation can utilize results generated by an older operation, as the second operation utilizes values that are retrieved from multiple registers by the first operation.

The method depicted in FIG. 5 can include designating (504), as a location from which the younger operation is to retrieve source data, a location at which the multi-slice computer processor (404) is to place resultant data generated by executing the older operation. Designating (504), as a location from which the younger operation is to retrieve source data, a location at which the multi-slice computer processor (404) is to place resultant data generated by executing the older operation may be carried out, for example, through the use of one or more fields contained with the smaller operations (412, 416) themselves. For example, the smaller operations (412, 416) depicted in FIG. 5 include a source location (508, 510) field for identifying the location of one or more source operands for the smaller operations (412, 416), as well as a target location (510, 516) field for identifying the location where data generated by executing the smaller operations (412, 416) should be placed. In such an example, designating (504), as a location from which the younger operation is to retrieve source data, a location at which the multi-slice computer processor (404) is to place resultant data generated by executing the older operation may be carried out by placing the same value (e.g., address, register number) in the source location (508, 514) field for the younger operation and the target location (510, 516) field for the older operation.

In the example method depicted in FIG. 5, the location from which the younger operation is to retrieve source data (which is also the location at which the multi-slice computer processor (404) is to place resultant data generated by executing the older operation) is available for use in executing instructions that do not need to be broken into a plurality of smaller operations. That is, unlike embodiments described in the description of related art section contained herein, the location from which the younger operation is to retrieve source data (which is also the location at which the multi-slice computer processor (404) is to place resultant data generated by executing the older operation) is not a dedicated register that is utilized to store intermediate results of each of the smaller operations.

Figure 6:
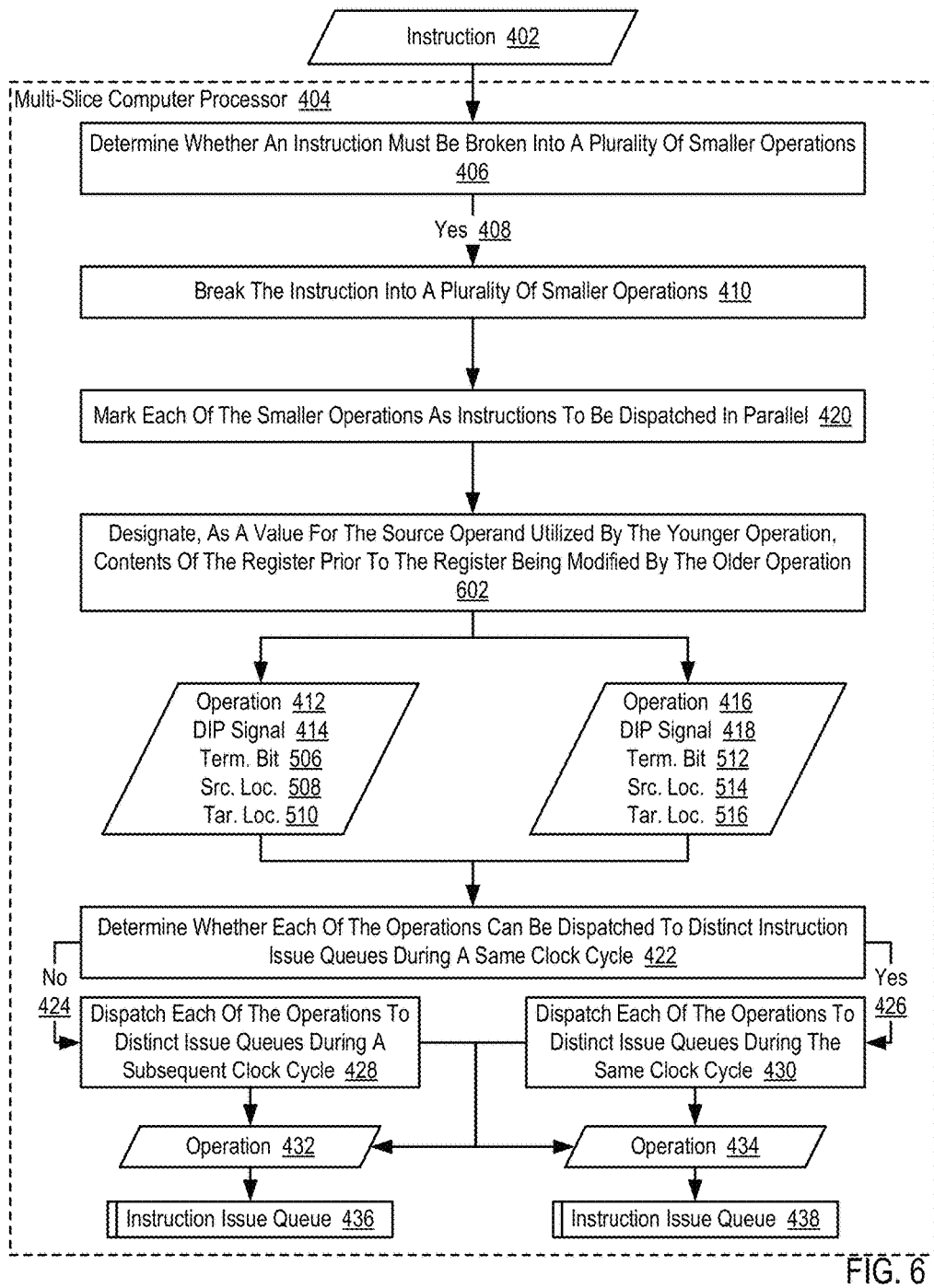
FIG. 6 sets forth a flow chart illustrating an additional example method for parallel dispatching of multi-operation instructions in a multi-slice computer processor according to embodiments of the present disclosure.

For further explanation, FIG. 6 sets forth a flow chart illustrating an additional example method for parallel dispatching of multi-operation instructions in a multi-slice computer processor (404) according to embodiments of the present disclosure. The example method depicted in FIG. 6 is similar to the example method depicted in FIG. 4, as the example method depicted in FIG. 6 also includes determining (406) whether an instruction (402) must be broken into a plurality of smaller operations (412, 416), breaking (410) the instruction (402) into a plurality of smaller operations (412, 416), marking (420) each of the smaller operations (412, 416) as instructions to be dispatched in parallel, determining (422) whether each of the smaller operations (412, 416) can be dispatched to distinct instruction issue queues (436, 438) during a same clock cycle, dispatching (430) each of the operations (432, 434) to distinct instruction issue queues (436, 438) during the same clock cycle in response to affirmatively (426) determining that each of the operations (432, 434) can be dispatched to distinct instruction issue queues (436, 438) during the same clock cycle, and dispatching (428) each of the operations (432, 434) to distinct instruction issue queues (436, 438) during a subsequent clock cycle in response to determining that each of the operations (432, 434) cannot (424) be dispatched to distinct instruction issue queues (436, 438) during the same clock cycle.

In the example method depicted in FIG. 6, an older operation can modify a register utilized as a source operand by a younger operation. In an example where the younger operation needs the original contents of such a register, rather than the intermediate contents of such a register that would result from the older operation updating the contents of the register, the multi-slice computer processor may be configured to designate (602), as a value for the source operand utilized by the younger operation, contents of the register prior to the register being modified by the older operation.

The present invention may be a system, a method, a computer processor, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of parallel dispatching of multi-operation instructions in a multi-slice computer processor, the method comprising:

determining whether an instruction must be broken into a plurality of smaller operations, wherein the plurality of smaller operations includes more than two smaller operations;

responsive to determining that the instruction must be broken into a plurality of smaller operations, breaking the instruction into the plurality of smaller operations to be executed in a sequence;

marking each of the smaller operations in the sequence as instructions to be dispatched in parallel, wherein marking each of the smaller operations as instructions to be dispatched in parallel comprises:

asserting, by an instruction decoder, a dispatch-in-parallel signal on a dispatch-in-parallel signal line between the instruction decoder and a dispatcher; and marking a last operation of the sequence of smaller operations as a terminating operation;

determining whether each of the operations can be dispatched to distinct instruction issue queues during a same clock cycle by determining whether a sufficient number of instruction issue queues have available slots such that each of the smaller operations can be dispatched to distinct instruction issue queues during the same clock cycle or whether some instruction issue queues have available slots but fewer than a sufficient number of instruction issue queues have available slots such that each of the smaller operations cannot be dispatched to distinct instruction issue queues during the same clock cycle;

responsive to determining that each of the operations can be dispatched to distinct instruction issue queues during the same clock cycle, dispatching each of the operations to distinct instruction issue queues during the same clock cycle; and responsive to determining that each of the operations cannot be dispatched to distinct instruction issue queues during the same clock cycle, delaying dispatch of each of the operations to distinct instruction issue queues until a subsequent clock cycle so that the operations can be dispatched in parallel.

2. The method of claim 1 wherein a younger operation utilizes results generated by an older operation.

3. The method of claim 2 further comprising designating, as a location from which the younger operation is to retrieve source data, a location at which the older operation is to place resultant data generated by executing the older operation, wherein the location is available for use in executing instruction that do not need to be broken into a plurality of smaller operations.

4. The method of claim 1 wherein an older operation modifies a register utilized as a source operand by a younger operation, the method further comprising designating, as a value for the source operand utilized by the younger operation, contents of the register prior to the register being modified by the older operation.

5. The method of claim 1,
wherein dispatching each of the operations to distinct instruction issue queues during the same clock cycle comprises:
dispatching a first operation of the smaller operations broken from the instruction to a first instruction issue queue on a first slice of the multi-slice computer processor; and
dispatching a second operation of the smaller operations broken from the instruction to a second instruction issue queue on a second slice of the multi-slice computer processor.

6. A multi-slice computer processor for parallel dispatching of multi-operation instructions, the multi-slice computer processor configured for:
determining whether an instruction must be broken into a plurality of smaller operations, wherein the plurality of smaller operations includes more than two smaller operations;
responsive to determining that the instruction must be broken into a plurality of smaller operations, breaking the instruction into the plurality of smaller operations to be executed in a sequence;
marking each of the smaller operations in the sequence as instructions to be dispatched in parallel, wherein marking each of the smaller operations as instructions to be dispatched in parallel comprises:
asserting, by an instruction decoder, a dispatch-in-parallel signal on a dispatch-in-parallel signal line between the instruction decoder and a dispatcher; and
marking a last operation of the sequence of smaller operations as a terminating operation;
determining whether each of the operations can be dispatched to distinct instruction issue queues during a same clock cycle by determining whether a sufficient number of instruction issue queues have available slots such that each of the smaller operations can be dispatched to distinct instruction issue queues during the same clock cycle or whether some instruction issue queues have available slots but fewer than a sufficient number of instruction issue queues have available slots such that each of the smaller operations cannot be dispatched to distinct instruction issue queues during the same clock cycle;

responsive to determining that each of the operations can be dispatched to distinct instruction issue queues during the same clock cycle, dispatching each of the operations to distinct instruction issue queues during the same clock cycle; and responsive to determining that each of the operations cannot be dispatched to distinct instruction issue queues during the same clock cycle, delaying dispatch of each of the operations to distinct instruction issue queues until a subsequent clock cycle so that the operations can be dispatched in parallel.

7. The multi-slice computer processor of claim 6 wherein a younger operation utilizes results generated by an older operation.

8. The multi-slice computer processor of claim 7 further configured for designating, as a location from which the younger operation is to retrieve source data, a location at which the older operation is to place resultant data generated by executing the older operation, wherein the location is available for use in executing instruction that do not need to be broken into a plurality of smaller operations.

9. The multi-slice computer processor of claim 6 further configured for wherein an older operation modifies a register utilized as a source operand by a younger operation, the multi-slice computer processor further configured for designating, as a value for the source operand utilized by the younger operation, contents of the register prior to the register being modified by the older operation.

10. The multi-slice computer processor of claim 6,
wherein dispatching each of the operations to distinct instruction issue queues during the same clock cycle comprises:
dispatching a first operation of the smaller operations broken from the instruction to a first instruction issue queue on a first slice of the multi-slice computer processor; and
dispatching a second operation of the smaller operations broken from the instruction to a second instruction issue queue on a second slice of the multi-slice computer processor.

11. A computing system, the computing system including a multi-slice computer processor configured for:
determining whether an instruction must be broken into a plurality of smaller operations, wherein the plurality of smaller operations includes more than two smaller operations;
responsive to determining that the instruction must be broken into a plurality of smaller operations, breaking the instruction into the plurality of smaller operations to be executed in a sequence;
marking each of the smaller operations in the sequence as instructions to be dispatched in parallel, wherein marking each of the smaller operations as instructions to be dispatched in parallel comprises:

asserting, by an instruction decoder, a dispatch-in-parallel signal on a dispatch-in-parallel signal line between the instruction decoder and a dispatcher; and marking a last operation of the sequence of smaller operations as a terminating operation;

determining whether each of the operations can be dispatched to distinct instruction issue queues during a same clock cycle by determining whether a sufficient number of instruction issue queues have available slots such that each of the smaller operations can be dispatched to distinct instruction issue queues during the same clock cycle or whether some instruction issue queues have available slots but fewer than a sufficient number of instruction issue queues have available slots such that each of the smaller operations cannot be dispatched to distinct instruction issue queues during the same clock cycle;

responsive to determining that each of the operations can be dispatched to distinct instruction issue queues during the same clock cycle, dispatching each of the operations to distinct instruction issue queues during the same clock cycle; and responsive to determining that each of the operations cannot be dispatched to distinct instruction issue queues during the same clock cycle, delaying dispatch of each of the operations to distinct instruction issue queues until a subsequent clock cycle so that the operations can be dispatched in parallel.

12. The computing system of claim 11 wherein a younger operation utilizes results generated by an older operation, the multi-slice computer processor further configured for designating, as a location from which the younger operation is to retrieve source data, a location at which the older operation is to place resultant data generated by executing the older operation, wherein the location is available for use in executing instruction that do not need to be broken into a plurality of smaller operations.

13. The computing system of claim 11 wherein an older operation modifies a register utilized as a source operand by a younger operation, the multi-slice computer processor further configured for designating, as a value for the source operand utilized by the younger operation, contents of the register prior to the register being modified by the older operation.

14. The computing system of claim 11,
wherein dispatching each of the operations to distinct instruction issue queues during the same clock cycle comprises:
dispatching a first operation of the smaller operations broken from the instruction to a first instruction issue queue on a first slice of the multi-slice computer processor; and
dispatching a second operation of the smaller operations broken from the instruction to a second instruction issue queue on a second slice of the multi-slice computer processor.

* * * * *